United States Patent
Dass et al.

(10) Patent No.: US 12,392,529 B2
(45) Date of Patent: Aug. 19, 2025

(54) AIR DISTRIBUTION SYSTEM AND METHOD INCLUDING A THERMOCOUPLE DEVICE

(71) Applicant: THE BOEING COMPANY, Chicago, IL (US)

(72) Inventors: Ranjith G. Dass, Bangalore (IN); Hafza K. Kurungattu Valappil, Bangalore (IN)

(73) Assignee: The Boeing Company, Arlington, VA (US)

( * ) Notice: Subject to any disclaimer, the term of this patent is extended or adjusted under 35 U.S.C. 154(b) by 662 days.

(21) Appl. No.: 16/890,698

(22) Filed: Jun. 2, 2020

(65) Prior Publication Data
US 2021/0318036 A1  Oct. 14, 2021

(30) Foreign Application Priority Data
Apr. 13, 2020  (IN) .............................. 202011015959

(51) Int. Cl.
*F25B 21/04* (2006.01)
*B64D 13/06* (2006.01)

(52) U.S. Cl.
CPC .............. *F25B 21/04* (2013.01); *B64D 13/06* (2013.01); *B64D 2013/0655* (2013.01); *F25B 2321/0251* (2013.01)

(58) Field of Classification Search
CPC .. F25B 21/04; F25B 2321/0251; B64D 13/06; B64D 2013/0655
See application file for complete search history.

(56) References Cited

U.S. PATENT DOCUMENTS

| | | | |
|---|---|---|---|
| 3,307,364 A | 3/1967 | De Coye De Castelet | |
| 4,706,908 A | 11/1987 | Huffman et al. | |
| 5,151,022 A | 9/1992 | Emerson et al. | |
| 8,230,689 B2 | 7/2012 | Kmetz et al. | |
| 2002/0000314 A1* | 1/2002 | Danieau | B60H 1/00985 165/203 |
| 2005/0230488 A1* | 10/2005 | Markwart | B64D 13/08 237/10 |

(Continued)

FOREIGN PATENT DOCUMENTS

EP  3 164 576 B1  7/2020

OTHER PUBLICATIONS

Indian Application No. 202011015959, Examination Report mailed Feb. 16, 2022.

*Primary Examiner* — Tavia Sullens
(74) *Attorney, Agent, or Firm* — Kunzler Bean & Adamson

(57) ABSTRACT

An air distribution system and method and an associated climate control device are provided for an aircraft in order to allow for more granular control of the temperature of the conditioned air distributed through the cabin of the aircraft. In one example, an air distribution system and method are configured to provide for individual temperature control within different zones of an aircraft, such as by associating a thermocouple device with a respective air distribution subsystem that delivers conditioned air to a respective zone. In another example, a climate control device is configured to allow individualized temperature control of the air discharged through a vent by associating a thermocouple device with the respective vent, thereby allowing for individual temperature control for a passenger onboard the aircraft.

20 Claims, 6 Drawing Sheets

(56) References Cited

U.S. PATENT DOCUMENTS

| | | | |
|---|---|---|---|
| 2006/0130490 A1* | 6/2006 | Petrovski | B60N 2/5642 |
| | | | 62/3.61 |
| 2007/0000255 A1* | 1/2007 | Elliot | B60H 1/00478 |
| | | | 62/3.5 |
| 2009/0064411 A1* | 3/2009 | Marquette | F25B 21/02 |
| | | | 62/3.5 |
| 2018/0148181 A1* | 5/2018 | Army | B64D 13/06 |
| 2020/0377216 A1* | 12/2020 | Pearson | F25B 21/04 |

\* cited by examiner

AIR DISTRIBUTION SYSTEM AND METHOD INCLUDING A THERMOCOUPLE DEVICE

TECHNOLOGICAL FIELD

An example embodiment of the present disclosure relates generally to an air distribution system and method and, more particularly, to an air distribution system and method that includes a thermocouple device.

BACKGROUND

Air distribution systems for controlling the temperature of a space oftentimes include a centralized source of conditioned air and a distribution network, such as a network of ducts, to distribute the conditioned air throughout the space. The temperature of the conditioned air is generally regulated by the source such that air of the same temperature is provided throughout the space. Thus, separate regulation of the temperature in different regions of a space is typically not provided if the conditioned air that is provided to the different regions originates with a common source.

By way of example, commercial aircraft may include an air distribution system that routes conditioned air from a centralized source, through a plurality of air distribution subsystems to a plurality of vents through which the air is discharged. The temperature of the air is regulated at the source such that air of the same temperature is typically discharged through each vent. This provision of air having the same temperature throughout the cabin of an aircraft does not allow for individual temperature control by the passengers and, as such, does not readily accommodate the different temperatures that may be experienced in different regions of the cabin and the different temperature preferences of the passengers. Instead, passengers are commonly limited to controlling the quantity of air flow through the vent associated with their passenger seat without any ability to control the temperature of the air discharged through the vent. Moreover, while passengers who are cold-natured may dress warmly and/or use blankets, jackets or the like to stay warm onboard an aircraft, warm-natured passengers lack similar techniques to remain cool while onboard the aircraft.

BRIEF SUMMARY

An air distribution system and method and an associated climate control device are provided for an aircraft in order to allow for more granular control of the temperature of the conditioned air distributed through the cabin of the aircraft. In an example embodiment, the air distribution system and method are configured to provide for individual temperature control within different zones of an aircraft. In another example embodiment, a climate control device is configured to allow individualized temperature control of the air discharged through a vent, thereby allowing for individual temperature control for a passenger onboard the aircraft. By providing for more individualized control with respect to the air temperature onboard an aircraft, passengers may be more comfortable and have an improved experience.

In an example embodiment, an air distribution system is provided for an aircraft. The air distribution system includes a plurality of air distribution subsystems configured to separately provide conditioned air to different zones of the aircraft. At least one zone of the aircraft includes at least a passenger compartment including a plurality of seats and a plurality of associated air vents through which the respective air distribution subsystem delivers conditioned air to the passengers. The air distribution system also includes a plurality of thermocouple devices. Each thermocouple device is associated with a different respective air distribution subsystem. The air distribution system further includes a controller configured to separately control operation of the plurality of thermocouple devices in order to provide for individual temperature control within the different zones. The controller is configured to control at least one of a polarity or a magnitude of a voltage applied to a respective thermocouple device.

At least one of the thermocouple devices of an example embodiment includes a thermocouple material having first and second opposed surfaces and first and second heat sinks in thermal communication with the first and second surfaces of the thermocouple material, respectively. In this example embodiment, the first surface of the thermocouple material may be maintained at a first temperature and the second surface of the thermocouple material may be maintained at a second temperature. The first temperature is greater than the second temperature. In this example embodiment, at least one of the thermocouple devices also includes a fan configured to circulate air across the thermocouple material. At least one of the thermocouple devices of an example embodiment is a Peltier device. The air distribution system of an example embodiment also includes a power supply configured to provide the voltage to the respective thermocouple device. In an example embodiment, a respective air distribution subsystem for a respective zone includes a plurality of ducts that deliver conditioned air to different portions of the respective zone.

In another example embodiment, a method is provided for distributing conditioned air throughout an aircraft. The method includes separately providing conditioned air through a plurality of air distribution subsystems to different zones of the aircraft. At least one zone of the aircraft includes at least a portion of the passenger compartment including a plurality of seats and a plurality of associated vents through with the respective air distribution subsystem delivers conditioned air to the passengers. The method also includes individually modifying the temperature of the air provided through the plurality of air distribution subsystems to the different zones of the aircraft by causing the air provided by a respective air distribution subsystem to be in thermal communication with a respective one of a plurality of thermocouple devices. The method further includes separately controlling operation of the plurality of the thermocouple devices in order to provide for individual temperature control within the different zones. By controlling the operation of a respective thermocouple device, the method controls at least one of a polarity or a magnitude of a voltage applied to the respective thermocouple device.

The method of an example embodiment also includes providing the plurality of thermocouple devices with at least one of the thermocouple devices including a thermocouple material having first and second opposed surfaces and first and second heat sinks in thermal communication with the first and second surfaces of the thermocouple material, respectively. In this example embodiment, the method may control operation of the respective thermocouple device by maintaining the first surface of the thermocouple material at a first temperature and maintaining the second surface of the thermocouple material at a second temperature. The first temperature is greater than the second temperature. The method of this example embodiment may control operation of the respective thermocouple device by causing a fan to circulate air across the thermocouple material. At least one of the thermocouple devices of an example embodiment includes a Peltier device. The method of an example embodiment may provide conditioned air by providing conditioned air to a respective zone via a respective air distribution subsystem that includes a plurality of ducts that deliver conditioned air to different portions of the respective zone.

In a further example embodiment, a climate control device is provided for an aircraft. The climate control device includes a thermocouple device that includes a thermocouple material having first and second opposed surfaces. The thermocouple device also includes first and second heat sinks in thermal communication with the first and second surfaces of the thermocouple material, respectively. The first surface of the thermocouple material is maintained at a first temperature and the second surface of the thermocouple material is maintained at a second temperature in response to electrical actuation by a power supply. The first temperature is greater than the second temperature. The climate control device also includes a passenger air duct configured to deliver conditioned at to a passenger onboard the aircraft. The first surface of the thermocouple material and the first heat sink are in thermal communication with air passing through the passenger air duct. The climate control device also includes a return air duct. The second surface of the thermocouple material and the second heat sink are in thermal communication with air passing through the return air duct.

The thermocouple device of an example embodiment includes a Peltier device. The climate control device of an example embodiment also includes the power supply configured to provide the electrical actuation to the thermocouple material. In this example embodiment, the climate control device may also include a controller configured to control a polarity and/or a magnitude of a voltage delivered by the power supply to the thermocouple material. The thermocouple device of an example embodiment also includes a fan configured to circulate air across the thermocouple material. In an example embodiment, the passenger air duct is configured to deliver the conditioned air via a single vent associated with a respective passenger onboard the aircraft.

BRIEF DESCRIPTION OF THE DRAWINGS

Figure 1:
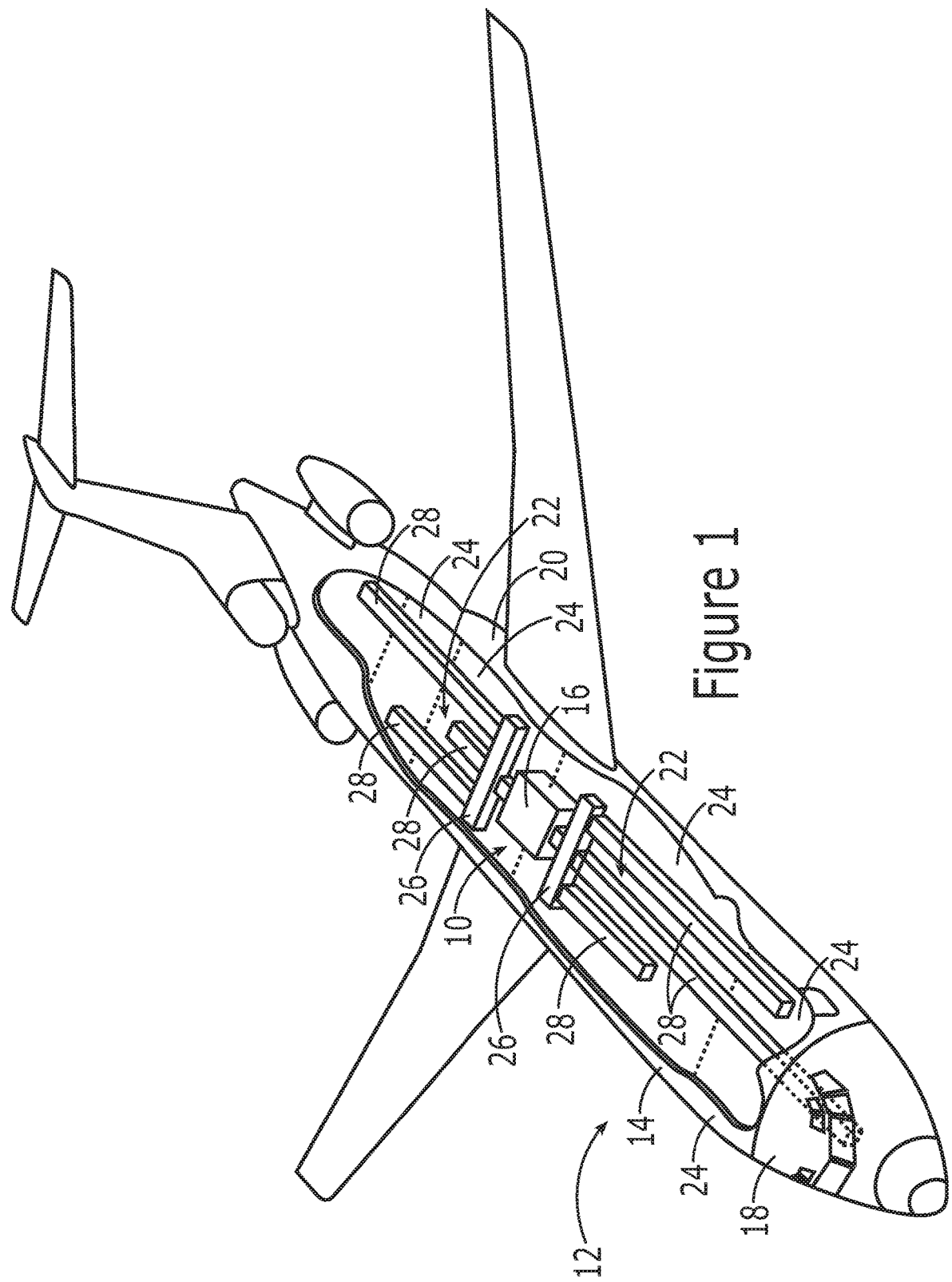
Figure 2:
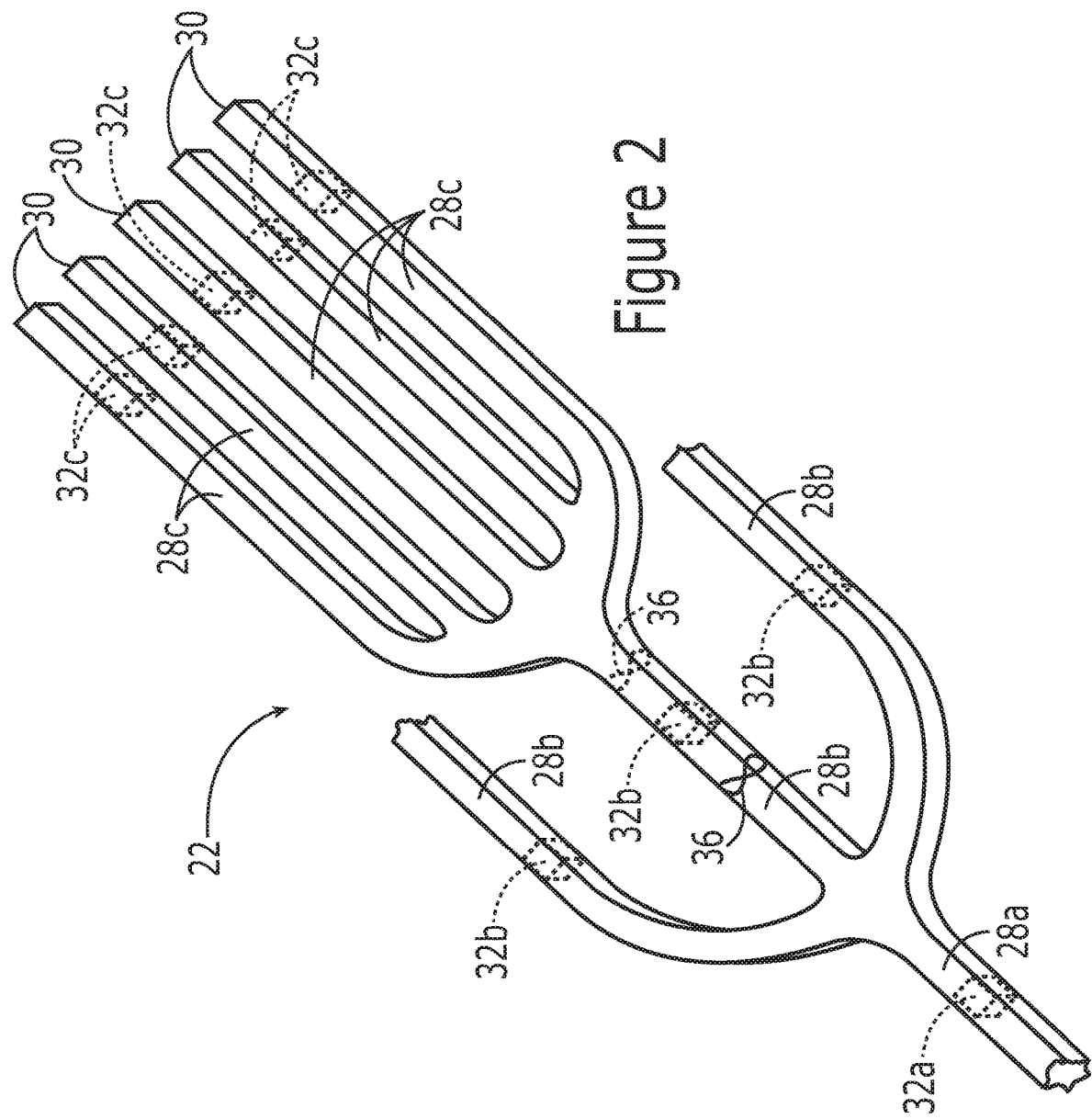
Figure 3:
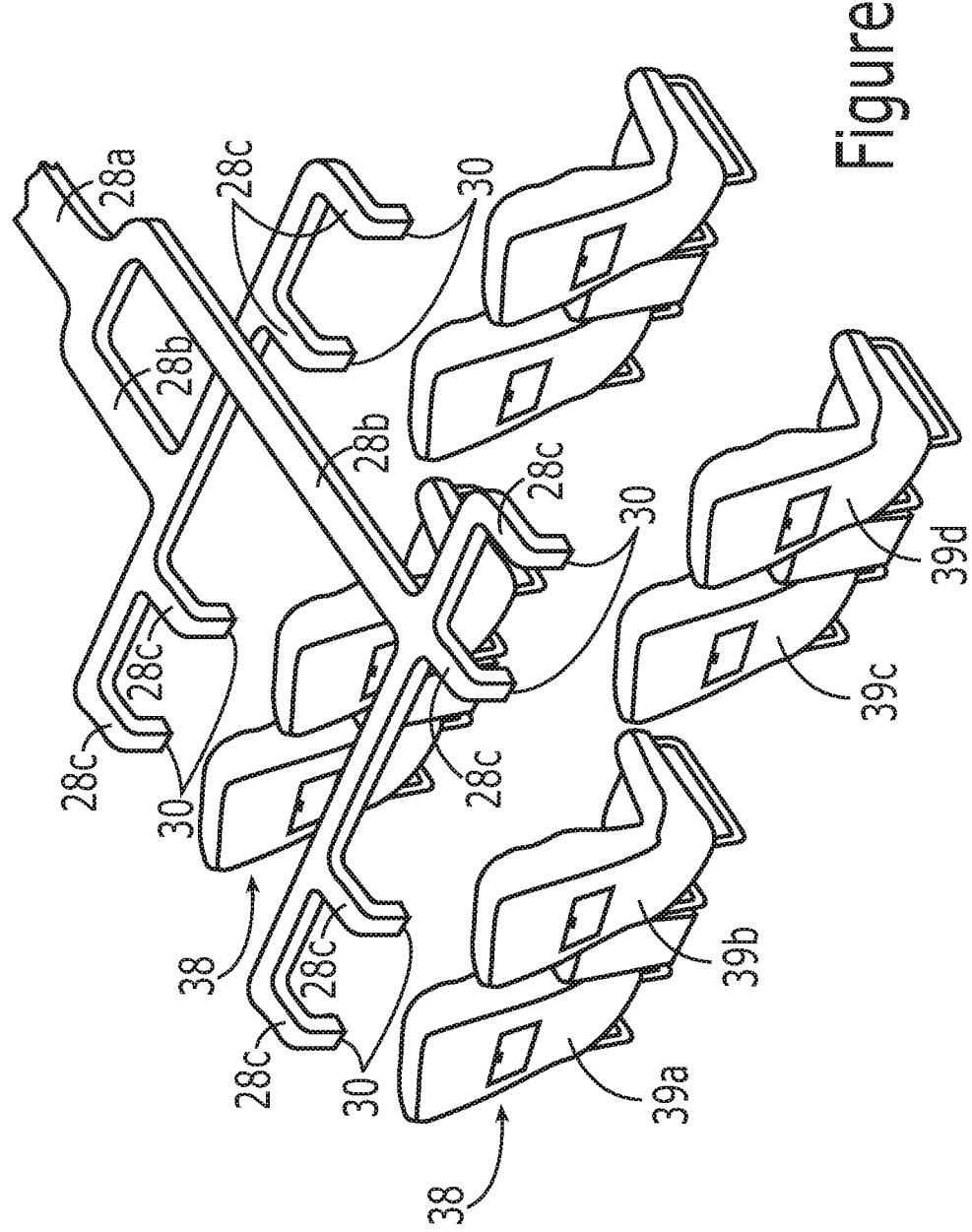
Figure 4:
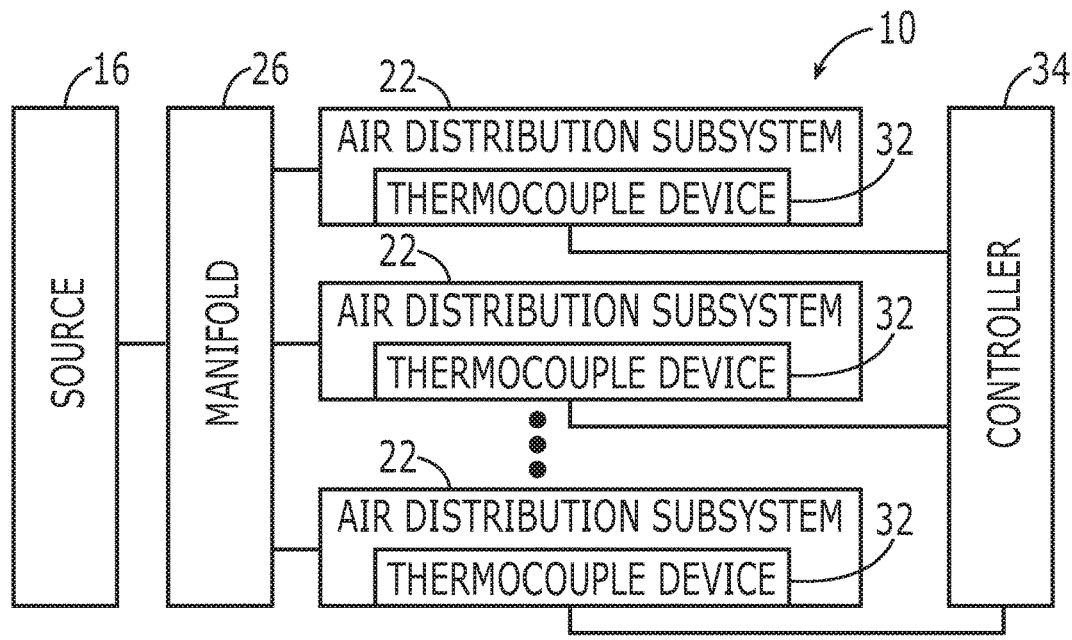
Figure 5:
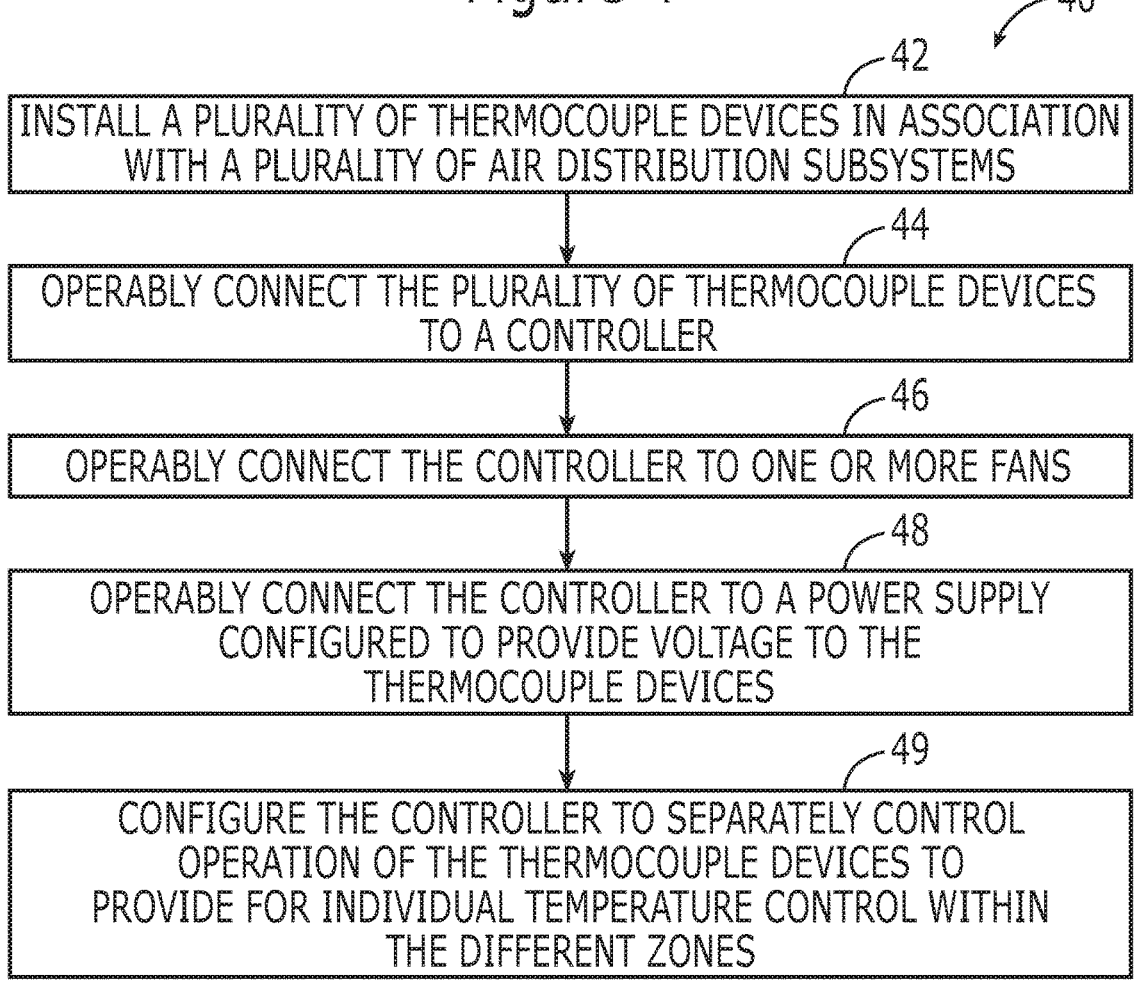
Figure 6:
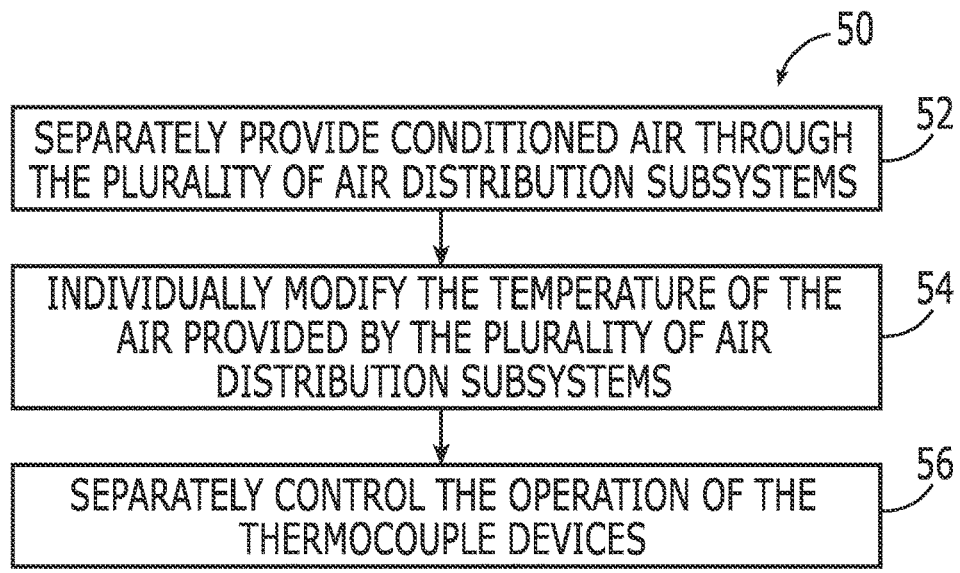
Figure 7A:
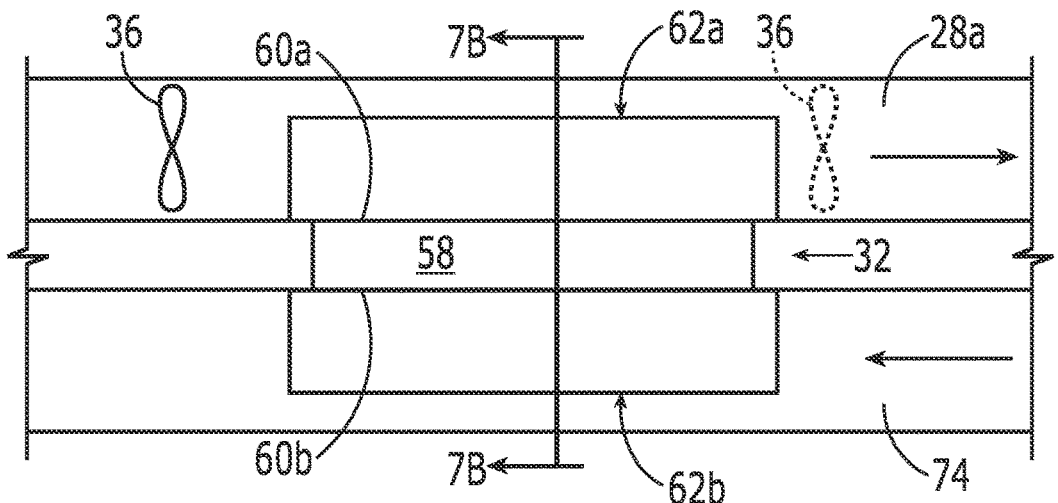
Figure 7B:
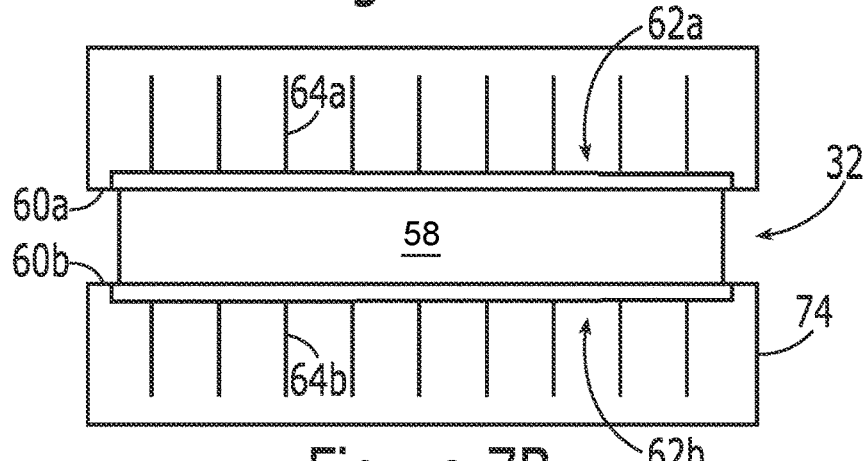
Figure 8:
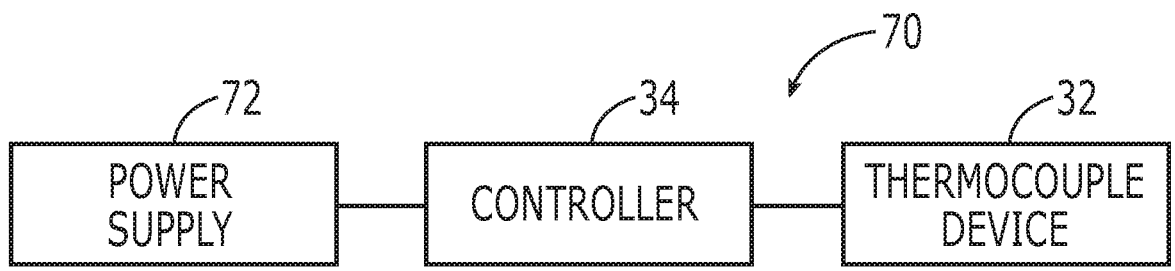
Figure 9:
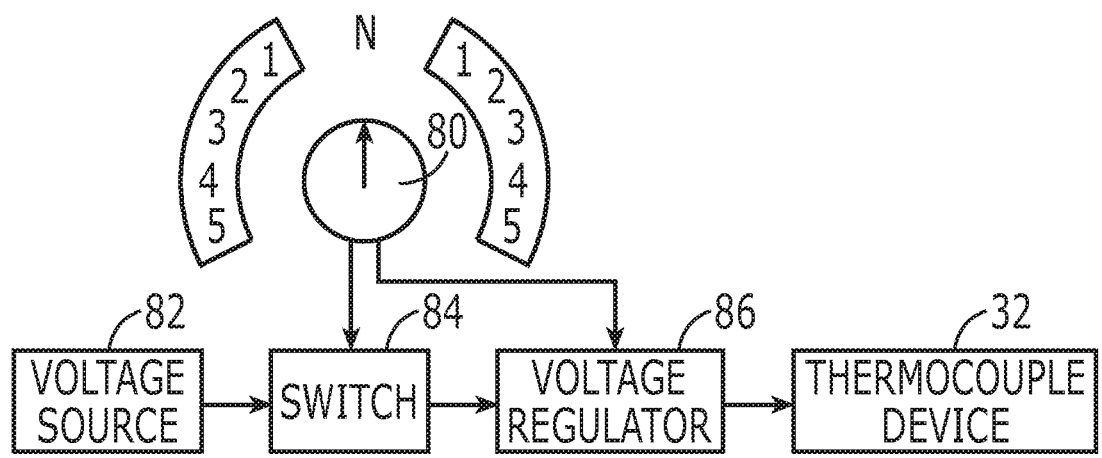

Having thus described certain example embodiments of the present disclosure in general terms, reference will hereinafter be made to the accompanying drawings, which are not necessarily drawn to scale, and wherein:

FIG. 1 is a schematic representation of an aircraft depicting an air distribution system having a plurality of air distribution subsystems for separately providing conditioned air to different zones of the aircraft in accordance with an example embodiment of the present disclosure;

FIG. 2 depicts a plurality of ducts that form an air distribution subsystem of an example embodiment;

FIG. 3 depicts a subset of the plurality of ducts of FIG. 2 that distribute condition air to individual seats within a respective zone of the aircraft in accordance with an example embodiment;

FIG. 4 is a block diagram of an air distribution system of an example embodiment;

FIG. 5 is a flowchart illustrating the operations performed to modify an air distribution system in accordance with an example embodiment;

FIG. 6 is a flowchart illustrating operations performed, such as by the air distribution system of FIG. 4, in accordance with an example embodiment;

FIGS. 7A and 7B are a side view and a cross-sectional view of a thermocouple device with a first heat sink disposed in a passenger air duct and a second heat sink disposed in a return air duct in accordance with an example embodiment;

FIG. 8 is a block diagram of a climate control device in accordance with an example embodiment; and FIG. 9 is a schematic representation of a control device in an accordance with an example embodiment.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

An air distribution system and method as well as an associated climate control device are provided in order to allow for more individualized regulation of the temperature of the conditioned air discharged, in one embodiment, to a zone or, in another embodiment, through a vent, such as a vent in association with a respective seat. As shown in FIG. 1, the air distribution system 10 and method may be deployed onboard an aircraft 12 in order to pressurize the cabin 14 and to regulate the temperature of the cabin. The air distribution system 10 includes a source 16 of conditioned air that is then distributed throughout the cabin 14 including throughout the cockpit 18 and the passenger compartment 20.

The source 16 of conditioned air onboard an aircraft 12 may be embodied in a variety of manners. In an example embodiment, the source 16 includes one, two or more air conditioning packs that produce a sufficient quantity of air having a desired temperature to maintain a desired cabin 14 environment.

The air distribution system 10 includes a plurality of air distribution subsystems 22 configured to separately provide conditioned air from the source 16 to different zones 24 of the aircraft 12. In the illustrated embodiment, the air distribution system 10 includes six air distribution subsystems 22, one of which provides conditioned air to the cockpit 18 and five of which provide conditioned air to different zones 24 of the passenger compartment 20. The number of air distribution subsystems 22 and, as a result, the number of different zones 24 can be varied in order to provide more or fewer zones onboard the aircraft 12 and may be dependent upon the type of aircraft, the size of the aircraft, the layout or configuration of the aircraft or other factors. Correspondingly, the relative locations of the zones 24 and the relative sizes of the different zones within the cabin 14, such as within the passenger compartment 20, may also be varied with the air distribution subsystems 22 and the corresponding zones of FIG. 1 depicted by way of illustration, but not of limitation. Regardless of the number of air distribution subsystems 22, the source 16 of the conditioned air may include one or more manifolds 26 in order to separately provide the conditioned air to the plurality of air distribution subsystems.

An air distribution subsystem 22 generally includes a plurality of ducts 28 that deliver conditioned air to different portions of the respective zone 24. The ducts 28 that comprise the air distribution subsystem 22 may be of different types and may be configured in different manners depending upon the relative locations of the source 16 of the conditioned air and the zone 24 to which the conditioned air is to be provided by the respective air distribution subsystem, as well as the size and configuration of the zone within the aircraft 12 that the air distribution subsystem is to service.

Although a plurality of air distribution subsystems 22 having a plurality of ducts 28 are schematically depicted in FIG. 1 by way of example, one of the air distribution subsystems is illustrated in more detail than FIG. 2, again by way of example, but not of limitation. As shown in FIG. 2, this example of an air distribution subsystem 22 includes a primary duct 28a that carries the conditioned air from the source 16 of the conditioned air, such as from the manifold 26 of FIG. 1 that provides the conditioned air to the respective air distribution subsystem, to a location within or at least closer to the zone 24 within the cabin 14 to which the conditioned air is to be provided. The air distribution subsystem 22 of the illustrated embodiment also includes a plurality of secondary ducts 28b in fluid communication with the primary duct 28a. The secondary ducts 28b extend from the primary duct 28a to different locations within or proximate the zone 24 to which the conditioned air is to be distributed. In the embodiment depicted in FIG. 2, the secondary ducts 28b branch outwardly from the primary duct 28a at different locations along the primary duct. However, all of the secondary ducts 28b may alternatively be connected to and branch outwardly from the same portion of the primary duct 28a, such as from a distal end of the primary duct, opposite the source 16. In the illustrated embodiment, the air distribution subsystem 22 also includes one or more tertiary ducts 28c that are in fluid communication with a respective secondary duct 28b and that extend to different regions within the zone 24.

By way of example, a zone 24 onboard an aircraft 12 may include a portion of the passenger compartment 18 that includes two rows 38 of passenger seats with each row including four seats 39a, 39b, 39c, 39d, as shown in FIG. 3. The air distribution subsystem 22 that serves an example zone 24 may include one primary duct 28a that splits into two secondary ducts 28b, each of which supplies air to one row 38 of passenger seats 39a, 39b, 39c, 39d. In order to separately deliver conditioned air via the vents 30 associated with each seat 39a, 39b, 39c, 39d of a respective row 38, the air distribution subsystem 22 of this example embodiment may include four tertiary ducts 28c that extend from each respective secondary duct 28b to the vents associated with respective seats within the row served by the respective secondary duct. Thus, the primary duct 28a of this example of an air distribution subsystem 22 is configured to carry the conditioned air from the source 16 toward the zone 24 of the aircraft 12 to which the conditioned air will be discharged, while the secondary ducts 28b are configured to carry the conditioned air to different regions within the zone of the aircraft and the tertiary ducts 28c are configured to carry the conditioned air to individual vents 30 of the aircraft, such as the vents associated with respective passenger seats 39a, 39b, 39c, 39d through which the conditioned air will be discharged. It is noted, however, that the air distribution subsystem 22 depicted in FIGS. 2 and 3 and described herein is provided by way of an example, but not as a limitation as the number and type of ducts that comprise a respective air distribution subsystem may be varied in other embodiments.

The air distribution system 10 also includes one or more thermocouple devices 32 configured to controllably regulate the temperature of the air that is proximate to, in the vicinity of or otherwise passing by the thermocouple device. In one embodiment, a thermocouple device 32 is associated with a respective air distribution subsystem 22 and, as a result, is configured to regulate the temperature of the conditioned air discharged by the air distribution subsystem throughout the zone 24 of the aircraft 12 serviced by the respective air distribution subsystem. In this example embodiment, the air distribution system 10 includes a plurality of thermocouple devices 32, at least one of which is associated with each respective air distribution subsystem 22. In order to provide for uniform regulation of temperature within a zone 24 but separate regulation between the zones, the thermocouple devices(s) 32 of a respective air distribution subsystem 22 of an example embodiment may be associated with, e.g., positioned within, the primary duct 28a of the air distribution subsystem as indicated by the location designated 32a in FIG. 2 and/or upstream of the secondary ducts 28b. Alternatively, a plurality of thermocouple devices 32 may be associated with, e.g., positioned within, the ducts downstream of the primary duct 28a, such as at locations designated 32b and 32c within the secondary and tertiary ducts 28b, 28c, respectively, with each of the thermocouple devices of the air distribution subsystem 22 controlled to regulate the temperature delivered throughout the zone in the same manner. In either of these embodiments, since each thermocouple device 32 may be separately controlled in order to individually regulate the temperature of the air in thermal communication with a respective thermocouple device, the air distribution system 10 of this example embodiment provides for separate temperature control of the different zones 24 within the cabin 14 of an aircraft 12, while maintaining a uniform temperature within a respective zone.

FIG. 4 is a block diagram of an air distribution system 10 having a plurality of air distribution subsystems 22 and a plurality of thermocouple devices 32, each of which is associated with a different respective air distribution subsystem. As shown in FIG. 4, the air distribution system 10 of this example embodiment also includes a controller 34 configured to separately control operation of the plurality of thermocouple devices 32. By providing for separate control of the thermocouple devices 32, the controller 34 is configured to provide, in one embodiment, for individual temperature control within the different zones 24 of the aircraft 12 or, in another embodiment, for individual temperature control of the air delivered via the different vents 30 associated with the passenger seats. As described below, the controller 34 is configured to separately control at least one of a polarity and/or a magnitude of a voltage applied to the different thermocouple devices.

The controller 34 may be embodied in various manners, such as by being embodied by one or more microprocessors, one or more coprocessors, one or more multi-core processors, one or more controllers, one or more computers, various other processing elements including integrated circuits or other specially configured hardware such as, for example, an ASIC (application specific integrated circuit) or FPGA (field programmable gate array), or some combination thereof for conducting one or more operations described herein. In some example embodiments, the controller 34 is configured to execute instructions stored in a memory device or otherwise accessible thereto in order to perform one or more of the functionalities described herein.

A method 40 of modifying an air distribution system 10 of an aircraft 12 to facilitate temperature control is depicted in FIG. 5 in accordance with an example embodiment. As shown in block 42, a plurality of thermocouple devices 32 are installed in association with different air distribution subsystems 22. For example, the plurality of thermocouple devices 32 may be installed in different ducts 28, such as different secondary ducts 28b or different tertiary ducts 28c so as to appropriately and independently condition the air passing therethrough. As shown in block 44, the thermocouple devices 32 are then operably connected to a controller 34. As shown in blocks 46, the controller 34 may also be operably connected to one or more fans 36 to control the flow of air over one or more thermocouple devices 32. The controller 34 may also be operably connected to a power supply 72 that is configured to provide voltage, under control of the controller, to the plurality of thermocouple devices 32. See block 48. Further, as shown in block 49, the controller 34 is configured to separately control operation of the plurality of thermocouple devices 32. By configuring the controller 34 to separately control the thermocouple devices 32, such as by configuring the controller to separately control at least one of the polarity and/or the magnitude of a voltage applied to the respective thermocouple devices, the controller may be configured to independently control the heating or cooling provided by the different thermocouple devices. Referring now to Figure 6, a method 50 performed, such as following construction and during operation of the air distribution system 10 of FIG. 4, is illustrated. As shown in block 42, conditioned air is separately provided through a plurality of air distribution subsystems 22 to different zones 24 of an aircraft 12. As also described above, at least one zone 24 of the aircraft 12 includes a portion of the passenger compartment 20 including a plurality of seats and a plurality of associated air vents 30 through which the respective air distribution subsystem 22 delivers conditioned air to the passengers.

As shown in block 54 of FIG. 6, the temperature of the air provided through the plurality of air distribution subsystems 22 to the different zones 24 of the aircraft 12 is individually modified. In this regard, the temperature of the air provided by a respective air distribution subsystem 22 is caused to be in thermal communication with a respective one of the plurality of thermocouple devices 32 which, in turn, is capable of modifying the temperature of the air prior to discharge within the respective zone 24 of the aircraft 12. With reference to block 56 of FIG. 6, the operation of the plurality of thermocouple devices 32 is separately controlled in order to provide for individual temperature control of the different zones 24. In this regard, the operation of a respective thermocouple device 32 may be controlled by controlling, such as with a controller 34, at least one of the polarity and/or the magnitude of a voltage applied to the respective thermocouple device.

Although a thermocouple device 32 may be configured in different manners, one example of the thermocouple device is depicted in FIGS. 7A and 7B. In this example embodiment, the thermocouple device 32 may be a Peltier device. However, the other types of thermocouple devices 32 may be employed in accordance with other example embodiments of the present disclosure. In the illustrated embodiment, the thermocouple device 32 includes a thermocouple material 58, such as comprised of two dissimilar electrically conductive materials that form an electrical junction, having first and second opposed surfaces 60a, 60b, such as first and second opposed major surfaces. The thermocouple device 32 of the illustrated embodiment also includes first and second heat sinks 62a, 62b in thermal communication with the first and second surfaces 60a, 60b of the thermocouple material 58, respectively. The heat sinks 62a, 62b may be configured in different manners and, in one embodiment, may include a plurality of fins 64a, 64b to facilitate heat transfer. Although the fins 64a, 64b of a heat sink may be configured in various manners, the heat sinks 62a, 62b may include folded fins that are bonded, brazed or soldered to the respective surface 60a, 60b of the thermocouple material 58. The fins 64a, 64b of a heat sink 62a, 62b may be formed of any of a variety of thermally conductive materials including, for example, aluminum, copper or carbon based materials. In other example embodiments, the heat sinks 62a, 62b may include heat pipes, thermosiphons, heat spreaders or the like and/or may be disposed in vapor chambers to facilitate the thermal capacity of the heat sinks.

The thermocouple device 32 and, in particular, the thermocouple material 58 is responsive to electrical actuation, such as provided by a power supply 72 (see FIG. 8). In this regard, in response to a voltage applied by the power supply and the resulting current through the thermocouple material 58, a temperature differential will be created between the first and second opposed surfaces 60a, 60b of the thermocouple material. For example, a voltage of a first polarity, such as a positive voltage, may cause the first surface 60a to be heated and the second surface 60b to be cooled such that the first surface of the thermocouple material is maintained at a first temperature and the second surface of the thermocouple material is maintained at a second temperature with the first temperature being greater than the second temperature. Conversely, a voltage of a second polarity, such as a negative voltage, may cause the first surface 60a to be cooled and the second surface 60b to be heated such that the first surface of the thermocouple material is maintained at a first temperature and the second surface of the thermocouple material is maintained at a second temperature with the first temperature being less than the second temperature. Thus, the polarity of the voltage controls which surface is heated and which surface is cooled.

By varying the magnitude of the voltage applied to the thermocouple material 58, the extent of the temperature differential and, as a result, the first and second temperatures at which the first and second opposed surfaces 60a, 60b, respectively, are maintained may be modified. For example, by increasing the magnitude of the voltage of the first polarity applied to the thermocouple material 58, the first temperature at which the first surface 60a is maintained may be increased and the second temperature at which the second surface 60b is maintained is decreased. Alternatively, by reducing the magnitude of the voltage applied to the thermocouple material 58, the first temperature at which the first surface 60a is maintained may be decreased, while the second temperature at which the second surface 60b is maintained may be increased, thereby reducing the temperature differential therebetween although the first temperature continues to be greater than the second temperature in this example embodiment. As the foregoing examples demonstrate, the thermocouple device 32 of an example embodiment may be configured such that the temperature of both of the opposed surfaces 60a, 60b are altered with one surface increasing in temperature and the other temperature decreasing in temperature. Not only may the temperatures of the opposed surfaces both be altered in opposite directions, but the temperatures of the opposed surfaces may be altered in an inversely proportional manner, that is, by equal, but opposite amounts, e.g., +5 degrees for the first surface 60a and −5 degrees for the second surface 60b. By switching the polarity of the voltage applied to the thermocouple material 58, such as by applying a negative voltage to the thermocouple material, a temperature differential is still established between the first and second opposed surfaces 60a, 60b of the thermocouple material, but the second temperature at which the second surface is maintained is now greater than the first temperature at which the first surface is maintained.

The thermocouple device 32 may be associated with a passenger air duct, such as a duct of an air distribution subsystem 22, that provides conditioned air to a passenger or crew member. In an example embodiment in which the air distribution system 10 provides for zone-based temperature regulation, the thermocouple device 32 may be associated with, such as by being at least partially positioned within an air duct, such as a primary air duct 28a, e.g., at location 32a, that delivers the conditioned air for the entire zone. As shown in FIGS. 7A and 7B, the thermocouple device may be configured such that the first heat sink 62a and, in some embodiments, the first surface 60a are disposed within or at least in thermal communication with the air passing through the passenger air duct. In this example embodiment, the first temperature at which the first surface 60a of the thermocouple material 58 is maintained may be controlled as described below in order to correspondingly modify the temperature of the air flowing through the primary air duct and across the first surface and the first heat sink of the thermocouple device 32. Thus, in an instance in which the first temperature at which the first surface 60a of the thermocouple material 58 is maintained is greater than the temperature of the conditioned air, the temperature of the conditioned air is increased prior to delivery to the respective zone 24, the respective vent 30 associated with a passenger seat or the like. Alternatively, in an instance in which the first temperature at which the first surface 60a is maintained is less than the temperature of the conditioned air, the temperature of the conditioned air is reduced prior to delivery to the respective zone 24 or the respective vent 30 associated with a passenger seat.

The opposite surface of the thermocouple material 58, that is, the surface of the thermocouple material that is not exposed to the conditioned air being delivered to the zone 24 within the aircraft 12, such as the second surface 60b of the thermocouple material, is configured to dissipate the heat generated thereby. In this regard, the second heat sink 62b may be in thermal communication with a thermal mass, that is, the thermal capacity of the material forming the second heat sink to store thermal energy, sufficient to discharge the heat generated thereby. Alternatively, as shown in FIGS. 7A and 7B, the air distribution system 10 may include a return air duct 74 and the second surface 60b of the thermocouple material 58 and the second heat sink 62b may be in thermal communication with the air passing through the return air duct. The return air duct 74 serves to recirculate air for ventilation. In this example embodiment, the air passing through the return air duct 74 dissipates the heat generated by the second surface 60b of the thermocouple material 58 and withdrawn by the second heat sink 62b. Thus, the thermocouple device 32 may remain operational by appropriately managing the temperature of the thermocouple device with heat generated by one surface of the thermocouple material 58, such as the first surface 60a, being utilized to regulate the temperature of the air supplied to the respective zone 24 of the cabin 14 of the aircraft 12, while the heat generated via the opposite surface, such as the second surface 60b of the thermocouple material, is dissipated by air being discharge through the return air duct 74.

In an example embodiment depicted in FIG. 8, a climate control device 70 is provided that includes the thermocouple device 32 as well as a power supply 72 and, in some example embodiments, a controller 34. As described above, the power supply 72 is configured to provide the electrical actuation to the thermocouple material 58, with the controller 34 being configured to provide a control signal so as to control the polarity and/or the magnitude of the voltage delivered by the power supply to the thermocouple material. The controller 34 may be embodied as described above. In other embodiments, however, the controller 34 may be embodied by a control device that enables a person, such as a passenger, a crew member or the like, to set the desired temperature to a zone 24, to a vent 30 for discharge to a passenger seat or the like. For example, the control device may be a manual knob as described below that may be turned in opposite directions to increase or decrease the temperature. Alternatively, the control device may be embodied by a user interface that permits a passenger, a crew member of the like to input the desired temperature of the air that is provided to a zone, to a passenger or the like. Still further, the control device may include a temperature sensor that senses the temperature of the a zone 24, of the air delivered via a vent 30 or the like and an associated feedback circuit that provides control signals in response to the sensed temperature in order to controllably increase or decrease the temperature of the air in order to cause the temperature to be adjusted to a desired temperature level.

As such, in an embodiment in which the thermocouple device 32 is associated with a zone 24 of an aircraft 12, such as by being positioned at least partially within an air duct, such as a primary air duct 28a, that delivers the conditioned air for the entire zone, the first temperature at which the first surface 60a of the thermocouple material 58 is maintained may be modified, such as by input via a control device provided by a crew member. Thus, the temperature of the air flowing through the primary air duct 28a may be correspondingly regulated based upon the temperature of the first surface 60a and the first heat sink 62a of the thermocouple device 32, as modified by crew member input.

In the embodiment described above, the thermocouple device 32 is positioned, such as at location 32a in a primary duct 28a of an air distribution subsystem 22, so as to allow for common regulation of the temperature within a zone 24. In another embodiment, however, the thermocouple device 32 is positioned further downstream relative to an air distribution subsystem 22 and is associated with and configured to allow for the individual control the temperature of the conditioned air discharged via a respective vent 30, such as a vent associated with a respective passenger seat onboard the aircraft 12. Thus, the air distribution system 10 of this example embodiment includes a plurality of thermocouple devices 32 associated with different vents 30 onboard the aircraft 12, such as by including one or more of the plurality of thermocouple devices in association with, e.g., positioned within, a tertiary duct 28c that supplies air to a respective one of the vents, such as at a location designated 32c in FIG. 2. Since each thermocouple device 32 of this example embodiment may be separately controlled, such as by controller 34, in order to individually regulate the temperature of the air in thermal communication with a respective thermocouple device. The air distribution system 10 of this example embodiment therefore provides for individualized control of the temperature of the conditioned air discharged through the vents 30, such as by permitting individualized temperature control by each respective passenger onboard an aircraft 12, such as via a respective control device 60 as shown, for example, in FIG. 8.

In an embodiment in which the thermocouple device 32 is associated with a vent 30 which, in turn, is associated with a respective passenger seat, a plurality of climate control devices 70, with each coupled to a respective thermocouple device 32, enables each passenger individualized control of the air temperature for their respective seat. As such, the passenger of this example embodiment is enabled to regulate the temperature of the air provided via the vent 30 associated with the passenger seat, such as by providing input via a control device, such as a rotatable knob 80 as shown in FIG. 9. As described above and as shown in FIGS. 7A and 7B, the first surface 60a of the thermocouple material 58 and the first heat sink 62a may be in thermal communication with air passing through the passenger air duct, such as a tertiary duct 28c. As such, the resulting first temperature of the first surface 60a of the thermocouple material 58 causes the temperature of the conditioned air delivered to the passenger to be correspondingly modified, such as by increasing the temperature of the air delivered to the passenger in an instance in which the first temperature is greater than the temperature of the air supplied by the source 16 or by decreasing the temperature of the air delivered to the passenger in an instance in which the first temperature is less than the temperature of the air supplied by the source. As also described and as shown in FIGS. 7A and 7B, the second surface 60b of the thermocouple material 58 and the second heat sink 62a may be in thermal communication with air passing through a return air duct 74 in order to remove heat from the second surface.

As noted above, either in conjunction with the control of the temperature of the air delivered to a respective passenger or a respective zone or more generally to the cabin 14 in an embodiment that employs centralized air, the controller 34 may be embodied by a feedback circuit that may be utilized to provide control signals in response to a sensed temperature in order to controllably increase or decrease the temperature of the air in order to cause the temperature to be adjusted to a desired and consistent temperature level. In terms of centralized temperature control, the temperature of the air delivered to locations closer to the source 16 of the air may be of a different, e.g., greater, temperature than the temperature of the air delivered to locations much further from the source. By sensing the temperature of the air delivered to different portions of the cabin 14, a feedback circuit of the controller 34 may control the operation of one or more thermocouple devices 32 in order to regulate the temperature of the air throughout the cabin so as to maintain the temperature more consistent. For example, the thermocouple device(s) may be responsive to a feedback circuit of the controller 34 to control the temperature of the air delivered to locations further from the source, such as by increasing the air temperature so as to be consistent, e.g., approximately the same, with the temperature of the air delivered to locations closer to the source 16.

Another example of a controller 34 and, more particularly, a control device that may be utilized to control the temperature of the air delivered to a zone or delivered to a particular passenger is depicted in FIG. 9. As shown, the control device of this example embodiment includes a knob 80 that may be manually turned clockwise or counterclockwise from a neutral (N) position in which the thermocouple device 32 is inactive to increase or decrease, respectively, the temperature of the air. In addition to merely increasing or decreasing the air temperature, the magnitude of the increase or decrease is also controlled by the extent of the rotation of the knob 80. Relative to the scale provided by FIG. 9, rotation of the knob 80 to be aligned with greater numbers, e.g., 4 or 5, on the scale provides for a greater increase or decrease in the air temperature than rotation of the knob to be in alignment with smaller numbers, e.g., 1 or 2, on the scale.

In terms of operation, the control device of FIG. 9 controls the voltage delivered to the thermocouple device 32 from the power supply 72, embodied as a voltage source 82 in this example embodiment. In particular, the control device includes a switch 84, such as a relay switch, to switch the polarity of the voltage delivered to the thermocouple device 32 depending upon the direction, that is, clockwise or counterclockwise, that the knob 80 is rotated. For example, the switch 84 may be configured to cause a positive voltage to be delivered to the thermocouple device 32 in an instance in which the knob 80 is rotated in a clockwise direction so as to increase the air temperature that is delivered. Conversely, the switch 84 may be configured to cause a negative voltage to be delivered to the thermocouple device 32 in an instance in which the knob 80 is rotated in a counterclockwise direction so as to decrease the air temperature that is delivered.

The control device of this example embodiment also includes a voltage regulator 86, such as a variable resistor, to control the magnitude of the voltage delivered to the thermocouple device 32 depending upon the extent to which the knob 80 is rotated. In this regard, in response to smaller angular rotations of the knob 80, the voltage regulator 86 may introduce a smaller resistance to allow the magnitude of the voltage delivered to the thermocouple device 32 to be larger. Conversely, in response to larger angular rotations of the knob 80, the voltage regulator 86 may introduce a larger resistance to allow the magnitude of the voltage delivered to the thermocouple device 32 to be smaller. Thus, the control device of the example of FIG. 9 permits the temperature of the air that is delivered to be selectively controlled.

As shown in FIGS. 2 and 7A, the air distribution system 10 of an example embodiment includes one or more fans 36 positioned in respective ducts 28 in order to facilitate circulate of air therethrough. In relation to the air distribution system 10 including one or more thermocouple devices 32, the thermocouple devices may impede the flow of air through the respective duct 28. Thus, a fan 36 may be positioned upstream of a thermocouple device 32 as shown in solid lines to force air through the thermocouple device, and/or downstream of the thermocouple device as shown in dashed lines in FIG. 2 to pull air through the thermocouple device. Similarly, with reference to FIG. 7A, a fan 36 may be positioned upstream and/or downstream of a thermocouple device 32 as shown in solid and dashed lines, respectively, in order to facilitate air flow through the thermocouple device.

As described an air distribution system 10 and method and an associated climate control device 70 are provided for an aircraft 12 to allow for more granular control of the temperature of the conditioned air distributed through the cabin 14 of the aircraft. As such, passengers and crew members may be more comfortable and have an improved experience onboard the aircraft 12.

Many modifications and other aspects of the disclosure set forth herein will come to mind to one skilled in the art to which this disclosure pertains having the benefit of the teachings presented in the foregoing descriptions and the associated drawings. For example, although described herein with respect to a single thermocouple device 32 positioned within a respective air duct, the air distribution system 10 of other example embodiments may include a plurality of thermocouple devices positioned within a respective air duct, either at the same location within the air duct or at different locations with the air duct, and configured to collectively regulate the temperature of the air passing therethrough in the manner described herein. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An air distribution system for an aircraft, the air distribution system comprising:
    a source of air;
    a plurality of air distribution subsystems, wherein each air distribution subsystem of the plurality of air distribution subsystems is associated with a corresponding zone of a plurality of zones of the aircraft, wherein each zone of the plurality of zones comprises a plurality of passenger seats, wherein each air distribution subsystem of the plurality of air distribution subsystems is configured to receive air from the source of air and provide conditioned air to the corresponding zone of the plurality of zones, wherein each air distribution subsystem of the plurality of air distribution subsystems comprises a plurality of air vents, and wherein each air vent of the plurality of air vents of a corresponding air distribution subsystem of the plurality of air distribution subsystems delivers a corresponding portion of the air to a corresponding single passenger seat of the plurality of passenger seats of the corresponding zone of the plurality of zones;
    a plurality of thermocouple devices, wherein each thermocouple device of the plurality of thermocouple devices is configured to interact with the corresponding portion of the air delivered from a corresponding air vent of the plurality of air vents of a corresponding air distribution subsystem of the plurality of air distribution subsystems; and
    a controller configured to separately control operation of the plurality of thermocouple devices in order to provide for individual temperature control of the corresponding portion of the air delivered to each single passenger seat of the plurality of passenger seats of each zone of the plurality of zones, wherein the controller is configured to control at least one of a polarity or a magnitude of a voltage applied to each thermocouple device of the plurality of a thermocouple devices.

2. An air distribution system according to claim 1, wherein at least one of the thermocouple devices comprises:
    a thermocouple material having a first surface and a second surface opposing the first surface; and
    first and second heat sinks in thermal communication with the first surface and the second surface of the thermocouple material, respectively.

3. An air distribution system according to claim 2, wherein the first surface of the thermocouple material is maintained at a first temperature and the second surface of the thermocouple material is maintained at a second temperature, and wherein the first temperature is greater than the second temperature.

4. An air distribution system according to claim 3, wherein the first surface of the thermocouple material is maintained at the first temperature and the second surface of the thermocouple material is maintained at the second temperature in response to the controlled operation by the controller.

5. An air distribution system according to claim 2, wherein at least one of the thermocouple devices further comprises a fan configured to circulate air across the thermocouple material.

6. An air distribution system according to claim 2, wherein each air vent of the plurality of air vents is fluidically coupled with a corresponding passenger air duct of comprises a plurality of passenger air ducts, wherein the first surface of the thermocouple material and the first heat sink are in thermal communication with air passing through a corresponding passenger air duct of the plurality of passenger air ducts.

7. An air distribution system according to claim 6, wherein each thermocouple device of the plurality of thermocouple devices is located within a corresponding passenger air duct of the plurality of passenger air ducts.

8. An air distribution system according to claim 6, further comprising a return air duct, wherein the second surface of the thermocouple material and the second heat sink are in thermal communication with air passing through the return air duct.

9. An air distribution system according to claim 1, wherein the at least one of the polarity or the magnitude of the voltage comprises the magnitude of the voltage, wherein the air distribution system further comprises a power supply configured to provide the voltage to the plurality of respective thermocouple devices.

10. An air distribution system according to claim 1, wherein each air distribution subsystem of the plurality of air distribution subsystems further comprises a plurality of ducts, wherein each air vent of the plurality of air vents is fluidically coupled with a corresponding duct of the plurality of ducts, and wherein each thermocouple device of the plurality of thermocouple devices is located within a corresponding duct of the plurality of ducts.

11. An air distribution system according to claim 1, wherein the source of air is a centralized source of air comprising a primary duct, and wherein each air distribution subsystems of the plurality of air distribution subsystems is configured to receive air from the centralized source via the primary duct.

12. An air distribution system according to claim 11, wherein a return air duct returns air to the centralized source.

13. A method for modifying an air distribution system of an aircraft to facilitate temperature control, the method comprising:
    installing a thermocouple device of a plurality of thermocouple devices in each air duct of a plurality of air ducts of an air distribution subsystem;
    receiving a corresponding portion of air from a source of air in each air duct of the plurality of air ducts;
    distributing the corresponding portion of air to a corresponding vent of a plurality of vents of the air distribution subsystem;
    delivering the corresponding portion of air from each vent of the plurality of vents to a corresponding single passenger seat of a plurality of passenger seats of the aircraft;
    operably connecting the plurality of thermocouple devices to a controller; and
    configuring the controller to separately control operation of the plurality of thermocouple devices in order to provide for individual temperature control of the corresponding portion of the air delivered to each single passenger seat of the plurality of passenger seats, wherein the controller is configured to control at least one of a polarity or a magnitude of a voltage applied to each thermocouple device of the plurality of the thermocouple devices.

14. A method according to claim 13, wherein at least one of the plurality of thermocouple devices comprises:
    a thermocouple material having a first surface and a second surface opposing the first surface; and first and second heat sinks in thermal communication with the first surface and the second surface of the thermocouple material, respectively.

15. A method according to claim 14, wherein the installing the thermocouple device of the plurality of thermocouple devices in each air duct of the plurality of air ducts comprises installing the thermocouple device such that the second surface of the thermocouple material of the thermocouple device and the second heat sink of the thermocouple device are in thermal communication with air passing through a return air duct.

16. A method according to claim 14, wherein the thermocouple device of the plurality of thermocouple devices is installed in each air duct of the plurality of air ducts such that the first surface of the thermocouple material and the first heat sink are in thermal communication with air passing through a corresponding air duct of the plurality of air ducts.

17. A method according to claim 13, further comprising operably connecting the controller to one or more fans to control circulation of air across the plurality of thermocouple devices.

18. A method according to claim 13, wherein at least one of the plurality of thermocouple devices comprises a Peltier device.

19. A method according to claim 13, wherein the at least one of the polarity or the magnitude of the voltage applied to the plurality of thermocouple device comprises the magnitude of the voltage applied to the plurality of thermocouple devices, wherein the method further comprises operably connecting the controller to a power supply that is configured to provide the voltage, under control of the controller, to each thermocouple device of the plurality of thermocouple devices.

20. A method according to claim 13, wherein the source of air is a centralized source of air comprising a primary duct, and the air distribution subsystem is configured to receive air from the centralized source via the primary duct.

* * * * *